Aug. 24, 1937.  M. S. ROBERTSON  2,090,950
SPRAY APPARATUS
Filed June 12, 1936
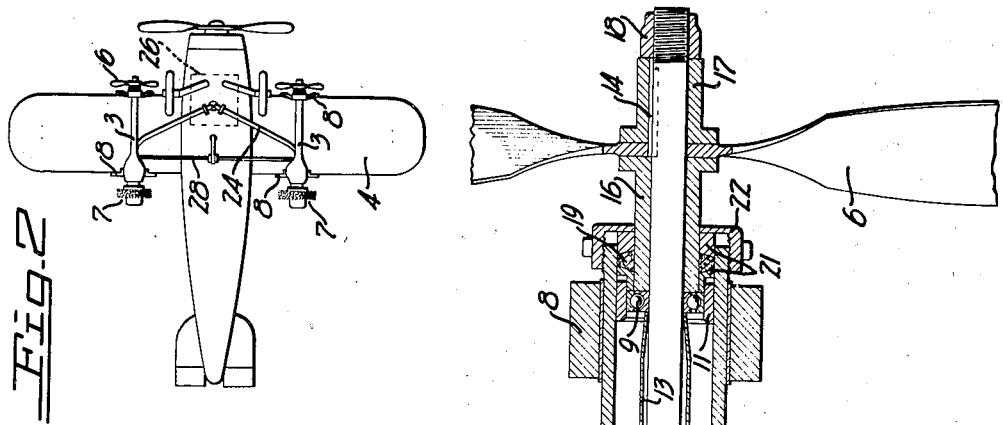
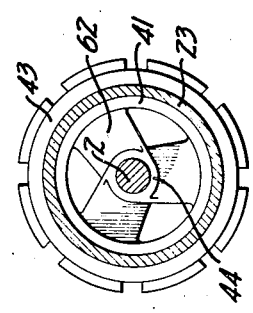
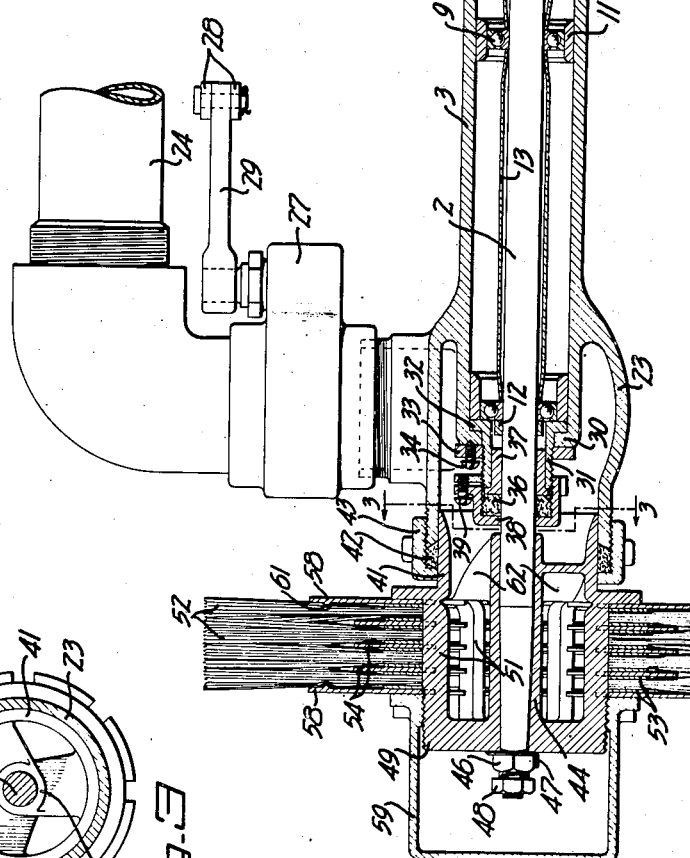
INVENTOR
MILTON S. ROBERTSON
BY Charles S. Evans
HIS ATTORNEY Patented Aug. 24, 1937

2,090,950

UNITED STATES PATENT OFFICE 2,090,950

SPRAY APPARATUS

Milton S. Robertson, Campbell, Calif., assignor to Independent Crop Dusting Inc., San Francisco, Calif., a corporation of California Application June 12, 1936, Serial No. 84,829

11 Claims. (Cl. 299—38)

My invention relates to apparatus for applying spray materials from airplanes; and the broad object of my invention is to provide an improved distributing head for such apparatus.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is an axial sectional view of my improved spray apparatus, portions of the drive shaft and bearing tube being omitted to shorten the view.

Figure 2 is a bottom view of an airplane showing the apparatus mounted in position under the wings.

Figure 3 is a transverse vertical sectional view showing the inclined impellers in the throat of the distributing head, the plane of section being indicated by the line 3—3 of Figure 1.

Figure 4 is a plan view of one of the brush spacing disks.

In terms of broad inclusion, the spray apparatus embodying my invention comprises a bearing adapted for mounting on an airplane, and in which a shaft is journalled. A distributing head is mounted on one end of the shaft for disseminating spray material from the plane, and a propeller is mounted on the other end of the shaft for driving the head. A chamber is provided for feeding spray material to the distributing head, and is preferably formed as an integral part of the bearing. The distributing head is provided with a hollow throat communicating with the chamber, and impellers are provided in the throat for forcing the spray material into the head. An annular brush is preferably provided on the head for disseminating the material, and adjustable means are preferably provided for compacting the bristles to control the dissemination of the spray material.

In greater detail, and referring particularly to Figures 1 and 2 of the drawing, the spray apparatus embodying my invention comprises a shaft 2 journalled in a bearing 3; the latter being preferably in the nature of tube extending transversely of an airplane wing 4. A propeller 6 is mounted on the leading end of the shaft 2, and a distributing head 7 is mounted on the trailing end. The spray unit is preferably suspended under the airplane wing, and suitable brackets 8 are provided for the mounting. One or more of these units may be provided. Two units are shown in Figure 2, one mounted on each side of the fuselage, but it is understood that this is merely for purposes of illustration.

As best shown in Figure 1, the shaft 2 is preferably journalled in suitable ball bearings 9 mounted in bearing stations 11 spaced along the bearing tube 3. The bearing stations reinforce the tube and space the inside bearings from the latter so that the ball bearings may be easily withdrawn from the tube. A thrust collar 12 is provided behind the rear ball bearing, and spacing tubes 13 are preferably provided for holding the inside bearings in position. By this arrangement the entire shaft and ball bearing assembly may be inserted or withdrawn as a unit. If desired, the inside bearings 9 may be omitted, and the shaft journalled directly in the bearing or tube 3.

Propeller 6 is locked to the shaft by a suitable key 14, and is held between a pair of sleeves 16 and 17, the inner sleeve 16 projecting into the bearing tube 3 to space the propeller from the forward bearing 9. The whole is then held together by a nut 18 threaded on the end of the shaft. A packing 19 is interposed between sleeve 16 and bearing tube 3, and is held between a pair of retainer rings 21 and compressed by a cap 22 surrounding the sleeve and threaded on the end of the bearing tube. This packing seals the bearing tube so that the latter will retain a lubricant.

An enlarged chamber 23 is provided adjacent the trailing end of the bearing tube for feeding the spray material to the distributing head. The chamber is preferably cast as an integral part of the bearing tube to provide a one-piece structure, the casting being preferably of light metal, such as aluminum. Chamber 23 connects with an inlet duct 24, through which the spray material is fed into the apparatus.

As shown in Figure 2, the duct 24 connects with a supply tank 26 located in the fuselage of the airplane. A suitable valve 27 is interposed in this duct, and is controlled from the pilot's compartment by a connecting rod 28 pivoted to a lever 29 on the valve. When two spray units are used, as shown in Figure 2, the rod 28 is extended across to simultaneously operate both valves.

Means are provided for sealing the end of the bearing tube against the entrance of spray material from chamber 23. As shown in Figure 1, the rear end of the bearing tube 3 projects into chamber 23, and the end of the extension is provided with an internal flange 30. A sleeve 31 extends into the bearing tube and is provided with an external flange 32 seated behind the tube flange 30. Nut 33 threaded on sleeve 31 and locked by a set screw 34 serves to hold the sleeve in place. The packing material 36 is held by sleeve 31, and is compressed between an internal sleeve 37 and a cap 38 threaded on sleeve 31. Cap 38 is preferably split and locked by a screw 39.

The distributing head 7 of the apparatus is mounted on the trailing end of shaft 2, and comprises a hollow rotor mounted on the end of the shaft and having a cylindrical throat portion 41 rotatable within the rear end of chamber 23. The joint between the chamber and rotor is sealed by a packing 42 held by a cap 43 threaded on the end of the chamber. Hub 44 of the rotor is preferably tapered to fit the complementary tapered end of the shaft, and is held by a nut 46 threaded on a reduced end of the shaft.

A washer 47 having outturned lips for engaging the rotor and nut respectively is preferably interposed between these elements, so that any tendency for relative rotation causes the nut to tighten and force the rotor more tightly on the shaft. A cup nut 48, threaded on the shaft and the nippled end of nut 46, operates to lock the latter.

The outer end of the rotor comprises a disk 49 formed integrally with the hub portion 44 and connected to the forward throat portion 41 by a plurality of circumferentially disposed arms 51. These arms also provide support for an annular porous member which surrounds the rotor and which functions to disseminate the spray material. This porous member preferably comprises a plurality of annular wire brushes 52 having radially extending bristles. The brushes are of the hollow core type having the base portions of the bristles clamped between retaining rings 53.

In order to provide passages for the spray material past the compacted base portions of the brushes, the latter are preferably spaced by disks 54 having inwardly extending arms 56 notched at their inner ends to engage the supporting arms 51 of the rotor. See Figure 4. Recesses 57 between the arms of the disk provide the passages for conducting the spray material into the loosely disposed outer portions of the bristles.

The brush assembly is mounted between a pair of end plates 58, held by a hub cap 59 threaded on the rotor. This cap also provides an adjustment for controlling the dissemination of the spray material. As shown in Figure 1, one or both of the end plates 58 are provided with inwardly projecting annular beads 61 bearing against the loosely disposed portions of the bristles above the spacing disks 54.

As the cap 59 is tightened up, the beads 61 press inwardly to compact the bristles. This compacting reduces the size and number of passages between the bristles, and results in a finer dissemination of the spray material.

Means are also preferably provided for forcing the spray material under pressure into the hollow core of the rotor and brushes. This is accomplished by providing a plurality of impellers 62 in the throat 41 of the distributing head. As shown in Figure 2, the impellers extend between the hub 44 and peripheral wall 41 of the rotor, and are angularly disposed with respect to the axis of the rotor. These angularly disposed impellers in the throat portion of the distributing head operate as a pump to withdraw the spray material from the chamber 23 and forcibly drive it into the hollow portions of the rotor. Once introduced between the bristles, the material passes outwardly along the bristles and is thrown radially from the peripheral portions of the brushes. The outward flow of material through the brushes is partly due to the driving action of the impellers 62, and partly to centrifugal force in the rotating head.

The apparatus of my invention will deliver the large quantities of spray material necessary for coverage by airplane application, and will handle the heavier as well as the lighter materials. The apparatus may be used to apply water solutions, paste emulsions, oils, oil suspensions, and other combinations of liquids and suspended solids; and is adapted for use with gaseous as well as liquid fluids.

One feature of the invention which increases the capacity of the unit for handling material is the positioning of the inlet duct adjacent one side of the chamber 23, so that the fluid enters the chamber tangentially. This causes the fluid to take a spiral path, and the arrangement is such that this spiral flow is in the direction of rotation of the impellers 62. The impellers then give added impulse to the fluid flow. This pump action is then augmented by the centrifugal action of the bristles in the revolving head.

In order to increase the pumping action of the bristles, and force the fluid to discharge from the tip ends of the bristles, the leading disk 58 may be enlarged to extend out to a point adjacent the tip portions of the brush.

Another feature which may be incorporated, for convenience in controlling the spray materials, is a separate control for the valves of each of the spray units shown in Figure 2. That is, instead of having a single rod 28 for operating both valves simultaneously, two rods may be provided so that the valves may be operated independently. In this way, a unit on one side of the plane may be shut off to cause dissemination from one side of the plane only.

I claim:
1. Spray apparatus comprising a shaft, a distributing head mounted on the shaft and having a hollow throat portion surrounding the shaft, impellers mounted in said throat, a chamber for spray material communicating with said throat, and an annular porous member on the head for receiving spray material from said throat.

2. Spray apparatus comprising a shaft, a chamber for spray material surrounding the shaft, a distributing head mounted on the shaft and having a hollow throat portion surrounding the shaft and rotatably mounted on said chamber, and impellers mounted in said throat.

3. Spray apparatus comprising a shaft, a chamber for spray material surrounding the shaft, a distributing head mounted on the shaft and having a hollow throat portion surrounding the shaft and rotatably mounted on said chamber, impellers mounted in said throat, and a packing gland for sealing the rotor connection between said throat and chamber.

4. Spray apparatus comprising a shaft, a bearing for the shaft, a chamber for spray fluid mounted on said bearing, a distributing head mounted on the shaft and having a hollow throat portion communicating with said chamber, and impellers mounted in said throat.

5. Spray apparatus comprising a shaft, a bearing for the shaft, a chamber for spray fluid mounted on said bearing, a distributing head mounted on the shaft and having a hollow throat portion communicating with said chamber, impellers mounted in said throat, and a packing gland surrounding the shaft adjacent said bearing.

6. Spray apparatus comprising a rotatable distributing head having a hollow core portion and a throat portion extending from said core, an annular porous member surrounding the core, and impellers mounted in said throat.

7. Spray apparatus comprising a rotatable distributing head having a hollow core portion and a throat portion extending from said core, an annular brush surrounding the core, and impellers mounted in said throat.

8. Spray apparatus comprising a chamber for spray material, a distributing head having a throat portion rotatably connected with the chamber and having a hollow core portion extending outwardly of said throat, impellers mounted in the throat, and an annular porous member surrounding said core.

9. In a spray apparatus, a distributing head comprising an annular brush, means for feeding spray material into the hollow core of the brush, means for rotating the brush to disseminate the material through the bristles, and adjustable means for compacting the bristles to control the dissemination of said material.

10. In a spray apparatus, a distributing head comprising a plurality of annular brushes arranged side by side, means for feeding spray material into the hollow core of the brushes, means for spacing the brushes to provide passages for flow of spray material past the inner portions of the brushes and into the loosely disposed outer portions of the bristles, means for rotating the brushes to disseminate the material through the bristles, and adjustable means for compacting said loosely disposed outer portions of the bristles to control the dissemination of said material.

11. In a spray apparatus, a distributing head comprising a plurality of annular brushes arranged side by side, means for feeding spray material into the hollow core of the brushes, means for spacing the brushes to provide passages for flow of spray material past the inner portions of the brushes and into the loosely disposed outer portions of the bristles, means for rotating the brushes to disseminate the material through the bristles, a plate adjacent each side of the outer brushes, one of said plates having an inwardly projecting bead adjacent its outer periphery, and adjustable means for pressing the plates together for compacting the loosely disposed outer portions of the bristles to control the dissemination of said material.

MILTON S. ROBERTSON.